United States Patent [19]

Gay et al.

[11] Patent Number: 5,188,179

[45] Date of Patent: Feb. 23, 1993

[54] DYNAMIC POLYSULFIDE CORROSION INHIBITOR METHOD AND SYSTEM FOR OIL FIELD PIPING

[76] Inventors: Richard J. Gay, 10810 Concho, Houston, Harris County, Tex. 77072; Charles C. Gay, 108 F. M. 1456, Bellville, Tex. 77418; Veronique M. Matthews, 4221 Red Cloud, Austin, Tex. 78759; Francoise E. M. Gay, c/o Chantal Dufour Bencze at 10611 Clematus, Houston, Tex. 77035; Valerie Chase, 9723 Willowwood, Houston, Tex. 77086

[21] Appl. No.: 813,195

[22] Filed: Dec. 23, 1991

[51] Int. Cl.5 ............... E21B 41/02; C23F 11/16; C23F 11/18
[52] U.S. Cl. ................... 166/310; 166/902; 203/7; 208/47; 422/7; 175/65
[58] Field of Search ............ 166/244.1, 279, 310, 166/902; 208/47; 252/387; 203/7; 422/712; 137/1

[56] References Cited

U.S. PATENT DOCUMENTS

| | | | |
|---|---|---|---|
| 2,973,316 | 2/1961 | Howland | 208/47 X |
| 3,272,736 | 9/1966 | Petro et al. | 208/47 X |
| 3,307,625 | 3/1967 | Johnson et al. | 166/902 X |
| 3,566,970 | 3/1971 | Crow et al. | 166/902 X |
| 3,989,459 | 11/1976 | Nose et al. | 422/12 |
| 4,147,212 | 4/1979 | Tisdale | 166/902 X |
| 4,608,191 | 8/1986 | Wu | 166/902 X |
| 4,633,949 | 1/1987 | Crowe | 166/310 X |
| 4,763,729 | 8/1988 | Ramanarayanan | 166/902 X |

OTHER PUBLICATIONS

Ternisien, J. A. et al., "Corrosion of Semi-Stainless Steel by Natural Gas from the Lacq Field", 249 Computus Rendus (French) 1655-1657 (1959).

Kauffman and Gay, "An Effective Passivating Oil Field Corrosion Control System", Final Technical Report, Mar. 31, 1986, 18 pages.

*Primary Examiner*—Stephen J. Novosad
*Attorney, Agent, or Firm*—Vaden, Eickenroht, Thompson, Boulware & Feather

[57] ABSTRACT

A system and method for inhibiting corrosion of oil field pipe exposed to corrosive material including hydrogen sulfide, carbon dioxide, and sodium chloride with a corrosion inhibiting film which is a precipitate film formed by the reaction of a polysulfide with ferrous iron. The ferrous iron may be a constituent of the fluid passing through the pipe or separately injected. The polysulfide is the reaction product of hydrogen sulfide as a constituent existing in the passing fluid and an oxidizing agent such as ammonium nitrate separately introduced into the passing fluid. The method includes the steps of continuously passing a fluid carrying corrodents through the pipe, continuously bringing a polysulfide into being within the fluid, and continuously bringing elemental ferrous iron into reaction with the polysulfide within the passing fluids to form a precipitated film which is an effectively amorphous film having a predominant amount of iron disulfide. The dissolving and abrasive characteristics of the passing fluid tends to continuously remove the amorphous film and the continuous reaction of the polysulfide with the ferrous iron continuously replenishes the amorphous film with an equilibrium state of removal and replenishment being established in time. Where there is an absence of hydrogen sulfide in the passing fluid, a polysulfide such as ammonium polysulfide or potassium polysulfide may be separately introduced in lieu of the oxidizing agent.

20 Claims, 1 Drawing Sheet

DYNAMIC POLYSULFIDE CORROSION INHIBITOR METHOD AND SYSTEM FOR OIL FIELD PIPING

FIELD OF THE INVENTION

This invention generally relates to methods for inhibiting corrosion in oil field pipe and more particularly pertains to a method of continuously bringing reactants together in a fluid passing through a pipe to form a precipitated film of iron disulfide on the interior wall of said pipe as an amorphous corrosion inhibiting coating which is continuously being removed away and also being continuously replenished by the continuing reaction of the reactants.

BACKGROUND OF THE INVENTION

Corrosion is now recognized as a serious problem in the development of geoenergy sources, including oil and natural gas reserves, geothermal, and geopressured systems. The corrosion problems are greatly aggravated by the presence of acid gases such as hydrogen sulfide and carbon dioxide, and by the co-production of brine solutions. Although the exact cost of corrosion to the oil and gas industry is difficult to establish, it is estimated to be in excess of ten percent of the annual investment of the industry. Accordingly, corrosion is an enormous cost to the industry every year.

The exploration and production corrosion problems becomes more severe as production from deeper formation becomes increasingly attractive. For example, the production of deep, sour gas reserves along the Rocky Mountains, and the deep geopressured zones in the Southern United States encounter bottom hole temperatures as high as 200° C. with pressure ranging up to 20,000 psi. More importantly is the fact that the produced gas may contain as little as 20% hydrocarbon (principally methane) with the balance being the acid gas carbon dioxide and hydrogen sulfide. These gases generally exist along with a high salinity sodium chloride brine in the producing formations with chloride contents ranging as high as several mols per kilogram of water. The pH of the downhole fluids may be as low as 2-3. Because the corrosivity of a fluid is frequently reflected by its pH value (the lower the pH, the more corrosive the fluid), it is clear that deep sour gas fluids are very corrosive systems indeed.

In the case of geopressured and geothermal systems, the acid gas contents are normally much lower. However, these systems are sometimes characterized by very high salinity brines and very high bottom hole temperatures. For example, the Salton Sea brines in Southern California contain as much as 150,000 ppm of chloride with bottom hole temperatures as high as 310° C. These fluids have ph values of 4-5, which are considerably higher than those estimated for deep sour gas systems. However, the higher bottom hole temperatures may more than compensate for the higher pH as far as corrosion severity is concerned.

As an alternative to the use of high alloy components (high cost as compared to common carbon steels), corrosion inhibitors have drawn considerable interest for mitigating corrosion downhole in producing wells. Inhibitors are intuitively attractive, since they permit the use of regular carbon steel components rather than the much more expensive high nickel, cobalt and chromium alloys. However, few inhibitors have been demonstrated to be effective under the extreme conditions (particularly of temperature) now encountered in many geoenergy formations. Certainly, the traditional amine based inhibitor formulations are unlikely to be effective because the mechanism of inhibition involves physical adsorption of the amine onto the metal surface to form a hydrophobic barrier film.

An attractive alternative is to use an inhibitor that chemically reacts with a surface to form an impervious film which will protect the underlying metal from further corrosion. The so called "passivating" inhibitors (e.g., chromate) belong to this class, and are frequently effective under very extreme conditions. The present invention, though different, and a continuing and dynamic process, performs as a corrosion inhibitor of this general nature.

This invention is also applicable to the corrosion protection of drill pipe through which drilling fluids containing the above mentioned corrodents are passed. In this present invention, the currently used drilling muds continue to perform as intended without tendency to coalesce and thus be reduced or eliminated in effectiveness.

In accordance with 37 C.F.R. §1.56 and 1.97, the following references are disclosed:

Kauffman and Gay, "An Effective Passivating Oil Field Corrosion Control System", Final Technical Report, Mar. 31, 1986.

The original work made for this invention was reviewed by a confidential review of the U.S. Department of Energy under Contract No. 03RI 008601, later examined through proprietary and confidential testing and validation performed by the Bureau of Engineering Research of the University of New Mexico College of Engineering under Contract DFGOI85CE15200. To Applicant's knowledge, the only report or document prepared as a result of this work which may be a publication is the above-cited reference. This Report is available upon request from the U.S. Department of Energy Technical Information Center.

This reference generally discusses the type of research performed and future research proposed by the inventor of the present invention in order to demonstrate the process claimed in the application. The information provided in the Final Technical Report is general in nature and does not disclose the invention of the present application. Ternisien, J. A., et al., "Corrosion of Semi-Stainless Steel by Natural Gas from the Lacq Field", 249 Comptus Rendus (French) 1655-1657 (1959).

This reference reports corrosion products consisting of an outer friable layer and an inner compact layer the latter composed of pyrite pyrrholite, and offering protection from the gas.

U.S. Pat. No. 3,989,459, Nose, Y., et al., "Method of Preventing Corrosion of Steelworks", Nov. 2, 1976.

A method for preventing corrosion of steelworks by a flowing corrosive solution having a pH of 6.7 to 7.1, and comprising water, ammonia, and hydrogen sulfide. Particularly, a method to prevent corrosion of steel material by adding 5 ppm to 0.3 wt % as the amount of available sulfur of sulfur, ammonium polysulfide and/or alkali polysulfides to the fluid as available.

None of the above-discussed references are sufficiently material, alone or in combination to render unpatentable the claims of the present application.

OBJECTS OF THE INVENTION

A primary object of the invention is to provide a corrosion inhibiting film on the interior wall of an oil field pipe which is continuously formed during flow of fluids through the pipe and which is formed continuously, readily, and inexpensively.

Another object of the invention is to provide a corrosion inhibiting film within an oil field pipe which may utilize constituents of the fluid flowing through the pipe to form the film.

Another object of the present invention is to provide a corrosive inhibiting film within an oil field pipe on a continuous basis such that any of such film as removed by the dissolving and abrasive action of the passing fluids is continually being replenished.

SUMMARY OF THE INVENTION

The foregoing and other objects and advantages of the invention are attained in a system for inhibiting corrosion in a length of oil field pipe exposed to corrosive material contained in the continuously passing fluid through the pipe. The corrosive materials are generally one or more of hydrogen sulfide, carbon dioxide, and sodium chloride in an aqueous phase. The corrosion inhibiting film which is formed is a precipitate film formed by the reaction of a polysulfide with ferrous iron. The ferrous iron may be a constituent of the passing fluid or separately introduced. The polysulfide is the reaction product of hydrogen sulfide as a constituent existing in the passing fluid and an oxidizing agent such as ammonium nitrate which is separately introduced into the passing fluid. An injector is provided to inject the oxidizing agent and also the ferrous iron as necessary.

The invention also provides the method of inhibiting as above outlined. The method includes the steps of continuously passing a fluid and carrying corrosives through the pipe, continuously bringing a polysulfide into being within the fluid, continuously bringing elemental ferrous iron into reaction with the polysulfide within the passing fluid to form a precipitated film which is an effectively amorphous film having a predominate amount of iron disulfide. The dissolving and abrasive characteristics of the passing fluid tends to continuously remove the amorphous film and the continuous reaction of the polysulfide with the ferrous iron continuously replenishes the amorphous film with an equilibrium state of removal and replenishment being established in time. Where there is an absence of hydrogen sulfide in the passing fluid, a polysulfide such as ammonium polysulfide or potassium polysulfide may be separately introduced in lieu of the oxidizing agent.

BRIEF DESCRIPTION OF THE DRAWING

The single

The illustration can also be construed as being a geothermal well producing steam from a subterranean formation. The illustration is also intended as an aid to visualize a well bore being drilled and containing a drill pipe having a drill bit on its lower end wherein drilling mud is being pumped down through the drill pipe and out the bit to be returned up to the earth's surface through the annulus formed within the well bore and around the outside of the drill pipe.

DESCRIPTION OF A PREFERRED EMBODIMENT

Figure 1:
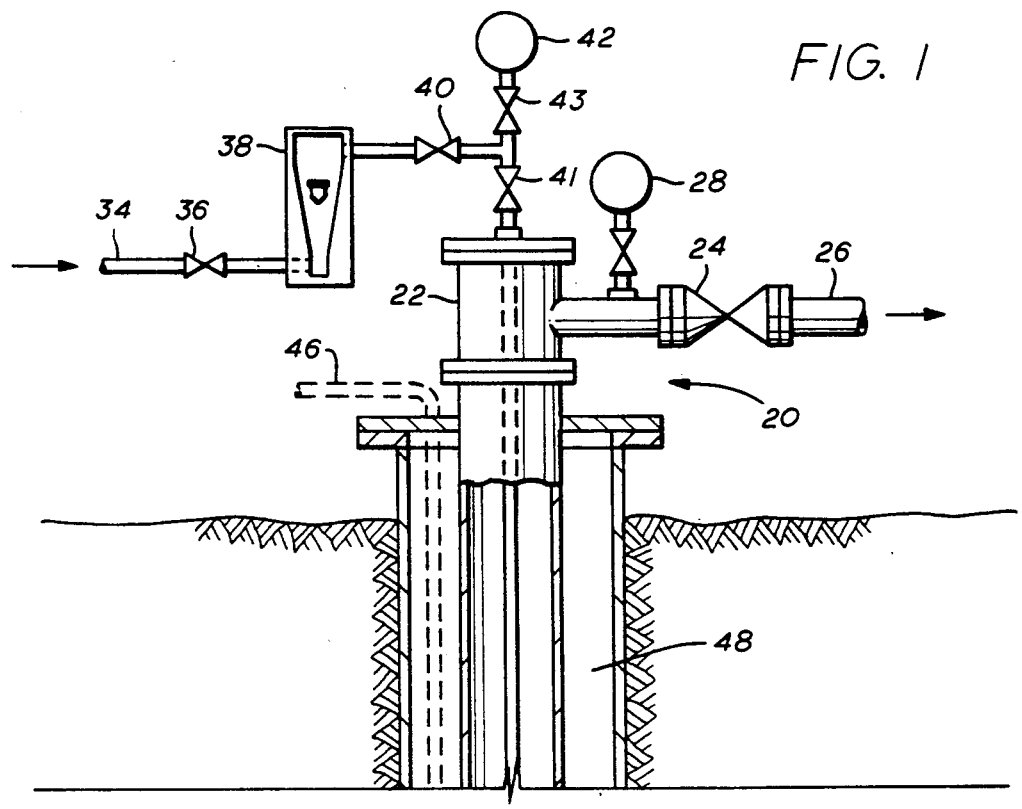
FIG. 1 is a generally schematic illustration of an oil or gas well which is producing oil and/or gas from a well formation.
Figure 1:
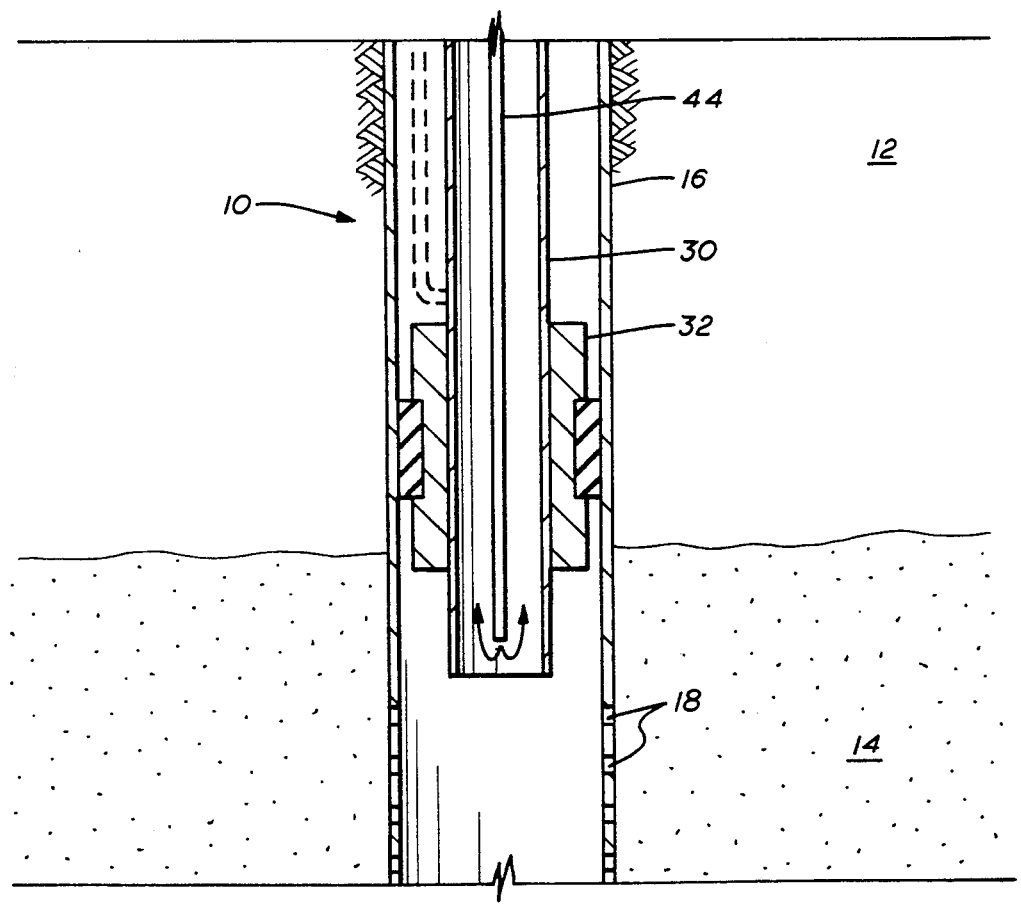

FIG. 1 typically illustrates a well bore 10 drilled into an earth formation 12 to extend into a fluids producing formation 14. Well casing 16 is installed to seal off the earth formation down to the producing formation 14. Casing perforations 18 are formed in casing 16 opposite the producing formation 14 so that fluids present in the producing formation 14 may freely flow into the casing 16.

At the earth's surface, the casing 16 is connected to a wellhead 20 including a production head 22. Production head 22 includes a pipe having attached thereto and a valve 24 in connection with a surface pipe 26. Pipe 26 may be connected into other piping or a vessel (not shown). A production pressure gauge 28 is connected to the production head 22 to indicate the fluid pressure within the head.

The well head 20 supports well tubing 30 which extends down into the well bore within the casing 16 to closely adjacent the casing perforation 18. The tubing 30 is usually anchored above the casing perforations 18. The tubing 30 is usually anchored above the casing perforations 18 through a production packer 32 as schematically shown.

At the earth's surface, an inhibitor source pipe 34 is connected through a metering control valve 36 and a flow rate indicator (Rotameter (R)) 38 and to the production head 20 through gate valve arrangement 40-41. An injection pressure gauge 42 is connected through the gate valve 43 to indicate the injection pressure of injection inhibitor fluids being injected through the Rotameter 38.

Inhibitors passing though the Rotameter 38 are connected through the production head 22 to a length of "macaroni" injection tubing 44 which extends downwardly through the well tubing 30 to a point near or slightly beyond the point of entry of well fluids form the formation 14 into the well tubing 30.

As illustrated, the well is assumed to be producing a fluid from the formation 14 as a flowing well powered by the formation pressure of the formation 14. In this illustration, the fluids may be oil, gas, or a mixture thereof, or alternately may be steam produced from a geothermal well.

There will be many situations where the well formation pressure is insufficient to flow the well as previously described and a well pump (not shown) is installed in the bottom of the well tubing 30 (not shown) with pumping sucker rods (not shown) extending from the bottom of the well tubing up through the well tubing to be reciprocated at the earth's surface by a mechanical pumping assembly (not shown), for example. In such case, an alternate injection tubing 46 indicated by dashed lines may be installed through the wellhead 20 to extend down through the annulus 48 defined between the well tubing 30 and the casing 16. In this situation, the injection tubing 46 may be connected to inject inhibitor into or immediately below the well tubing 30 (not shown) as through the side of the tubing, either above the packer 32 or through the packer 32 to below the packer 32. In some situations, the tubing 46 may be simply appended into annulus 48 at wellhead 20.

A flowing well as shown flows fluids from the formation 14 into the casing 16 up through the tubing 30 and out through the surface pipe 26 to be elsewhere received and utilized.

Inhibitor, as later described, is introduced through the source pipe 34, the control valve 36, the Rotameter 38, and the gate valves 40-41 to pass down through the injection tubing 44 to be blended in with the well fluids flowing from the producing formation 14.

As illustrated, the system is continuous and dynamic with continuing flow of fluids from formation 14 and Inhibitor flowing through the injection tubing 44 to be continuously mixed with the produced fluids at the bottom end of the well tubing 30.

To protect the inner walls of the casing 16 below the production packer 32, the injection tubing 44 alternately may be extended to down within the casing 16, below the tubing 30 and in the vicinity of the perforations 18.

The system is also continual when the well is being pumped and the injection of the Inhibitor is being made down through the alternate injection tubing 46 as above described.

In one system embodiment of the present invention, the producing formation 14 will be producing predominately crude oil along with some sodium chloride brine which carries hydrogen sulfide and a small amount of ferrous iron. Some carbon dioxide may be, or may not be present. In this example, the injected Inhibitor will be an aqueous solution of an oxidizing nitrate such as ammonium nitrate. The ammonium nitrate is injected down through the injection tubing 44 and out into the contact with the produced fluids at the bottom of well tubing 30. As the ammonium nitrate solution is brought into the produced fluids, it will react with the hydrogen sulfide as a continuing reaction to reduce the ammonium nitrate to a nitric oxide in acid solution plus water, and free sulfur which then forms the polysulfide. Other oxidizing agents may be, for example, the arsenic compounds, the nitrates, the ferric ion, potassium permanganate, benzoyl peroxide, diethyl polysulfide, and similar compounds known to those familiar with the art.

Once the disulfide is formed, it reacts with the ferrous iron present in the brine, also on a continuing basis, to form a dense precipitate film or layer on the interior surfaces of the well tubing 30. A chemical bond is formed between the initial interface of the disulide with the base metal surface of the tubing. The exact nature of this transition from base metal to the disulfide film is not known. The solubility of the precipitate, which is an amorphous form of ferrous disulfide and probably related compounds, is very low so that the film formation requires only small amounts of disulfide and ferrous iron. Since the precipitate does have a finite solubility, however, the film may dissolve if either of its components are absent from the solution in which it is in contact. For this reason, any of the film lost by dissolving (or by the abrasive nature of the flowing fluid) is replenished by the continuing reaction.

Considering the crude oil to be inert, a typical aqueous system may consist, for example, of an aqueous sodium chloride brine solution saturated with carbon dioxide and hydrogen sulfide at one atmosphere with the sodium chloride being 0.17 molar; the carbon dioxide being 0.018 molar; the hydrogen sulfide being 0.054 molar, and with the resulting composition having a pH of 4.5. The ferrous iron carried by the brine would be relatively high in iron content, about $10^{-5}$ molar Ammonium nitrate equivalent to 0.0015 molar is added to the produced fluids including the described composition.

In this example, less than 10% of the sulfide present will be converted to disulfide. The remaining acidic solution, containing sodium chloride, carbon dioxide, and hydrogen sulfide, would continue to be extremely corrosive. Most of the iron and disulfide will precipitate, with iron being the limiting species.

In another example, the produced fluid from the producing formation 14 will include carbon dioxide in the sodium chloride brine which carries the ferrous iron. In this example, sodium disulfide is injected through the injection tubing 44 to be brought into reaction at the bottom of well tubing 30. The resulting continuing reaction will form the precipitate as described above. Alternately, potassium polysulfide or sodium polysulfide, can be injected in lieu of ammonium disulfide with the potassium polysulfide being preferred.

As another example, elemental sulfur, preferably "wettable agricultural sulfur" may be injected down the injection tube 44 to continuously react with the ferrous iron as previously described.

For further information, routine tests were conducted under highly corrosive conditions. Results of the test, in terms of weight and thickness gains of the respective coupons, showed a mean specific weight increase of 2.0 mg/cm$^2$. All the coupons showed an increase in mean thickness amounting to 0.039 mm.

The mass gained simply divided by the volume gained was an approach taken to give a rough estimate of the film scale density. The mean apparent film density was 1.7 g/cm$^2$. Though a reasonable value, there is a large variation from sample to sample so it should not be viewed as an accurate indication of film density.

In addition, a Dupont Thermogravimetric Analyzer was used in attempt to identify specific mineral compounds in the film formed on the corrosion test coupons. This instrument has a range of 25-1200° C.

As a test, approximately 50 mg of specimen was scraped from a test coupon and placed in the sample pan of the analyzer and the analysis was run from 25-1200° C. at a rate of 20° C./minute. There was no indication of weight change on heating such as the weight loss typically occurring at the melting point of crystal infrastructures. If the scale specimen had been largely pyrite or marcosite, some weight loss above the melting points, 450° C. for pyrite and 1171° C. for marcosite, should have been observed as it changed to species with a higher iron/sulfur ratio.

Photomicrographs at 33X, 70X, and 1,500X were made of the film deposited on the text test coupons. Samples viewed in an "as received" showed a fine crystal structure on the surface with a grain size of 0.525 μm. Pictures of coupons after the "rapid corrosion test" showed no evidence of film or crystal on the surface, only a randomly pockmarked surface with features measuring 5-25 μm. On the coupons examined "as received" at 1,500X, the distribution of sulfur was essentially uniform showing no variation with surface structures observable. Iron, of course, was also uniformly distributed. Calcium and magnesium were not present in high enough concentrations to be detected. Scans for sulfur were made after the rapid corrosion test of the coupons. There was no sulfur left on the surfaces of these coupons.

The evidence confirms that the corrosion inhibition is provided by formation of an iron/sulfur film with a very fine crystalline structure, sufficiently fine to be considered as a substantially amorphous film. The film is formed under a wide range of conditions so long as there are disulfide and ferrous iron present. The disulfide can be introduced directly or by oxidation of sulfide ion. The film is effective at preventing corrosion in what could normally be an extremely corrosive environment, to wit: water containing 1% sodium chloride, with carbon dioxide at about 0.018 molar and hydrogen sulfide at 0.054 molar, and a pH of 4.5.

This film is easily destroyed by heating in 0.1 molar hydrochloric acid. However, it is quite stable mechanically. Over periods of several weeks, exposure to air has no observable effect on the film.

Chemically, the film is apparently not primarily iron pyrite, (iron disulfide) though it obviously consists largely of iron and sulfur. It is more likely a mixture of area species. It is possible that the film contains some carbonate as well as sulfur and ions. The film does not appear to contain calcium or magnesium or heavy cations other than iron.

Though the corrosion tests were somewhat limited, they served to prove that the process worked successfully under very severe base line conditions.

The invention is also viable to protect drill pipe form the corrodents present in drilling muds as are being pumped through and around the drill pipe while drilling a well. While the drilling mud may be free of corrodents initially, the corrodents are picked up in the drilling mud as the well is drilled through the earth's formations where such corrodents are present and wherein cuttings are mixed in with the drilling mud to be carried out of the well. A drilling environment may be visualized with reference to FIG. 1 wherein the well bore 10 is being drilled by a drill bit attached to a string of drill pipe extending down to the bottom of the well later to be replaced by the tubing 30 as shown. Drilling mud is pumped down through the drill pipe and the drill bit to be returned to the earth's surface through the annulus 48 along with the cuttings generated by the drill bit as it penetrates the earth's formation. The corrosion inhibitor as needed may be injected into the intake piping of the mud pump which is pumping the drilling mud down through the drill pipe (not shown).

The corrodents present in the drilling mud will be in the same relative proportion as produced from the well formation where the cuttings were taken to bring the corrodents into the drilling mud. The amount of corrodents in the drilling mud may be substantially smaller than the amount of corrodents later produced from the well formation but yet in sufficient quantity to cause serious corrosion of the drill pipe and associated surface piping through which the drilling mud is pumped.

It will be apparent to those skilled in the art that various changes and modifications may be made to the invention as herein specifically disclosed which will remain within the spirit of the invention and the purview of the claims.

What is claimed is:

1. In a method of inhibiting a pipe against corrosion as may be caused by corrodents, the steps comprising:
   (a) continually passing a fluid carrying corrodents through a pipe, said corrodents being at least one of the group consisting essentially of an aqueous phase of hydrogen sulfide, carbon dioxide, and sodium chloride;
   (b) continually bringing a polysulfide into said fluid;
   (c) continually bringing elemental ferrous iron into reaction with said polysulfide to form a precipitated film comprising an effectively amorphous iron disulfide on the interior surface of said pipe as corrosion inhibitor which tends to be continually dissolved away by said fluid while being continually replenished by the continuing precipitation from the continuing reaction of said polysulfide and said ferrous iron.

2. The method of claim 1 wherein said fluid is a mixture of hydrocarbons and water containing said ferrous iron.

3. The method of claim 2 wherein said polydisulfide is introduced from the group consisting essentially of ammonium polysulfide, sodium polysulfide, potassium polysulfide and elemental sulfur.

4. The method of claim 2 wherein said hydrocarbon is a gas.

5. The method of claim 3 wherein said hydrocarbons are a mixture of oil and gas.

6. The method of claim 2 wherein said hydrocarbon is oil.

7. The method of claim 1 wherein said polysulfide is a polysulfide reaction product of said hydrogen sulfide and an oxidizing agent.

8. The method of claim 7 wherein said oxidizing agent is selected from the group consisting essentially of the nitrates, arsenic compounds, the ferric ion, potassium permanganate, benzoyl peroxide, and diethylpolysulfide.

9. The method of claim 2 wherein said water includes hydrogen sulfide.

10. The method of claim 9 wherein said ammoinium nitrate is brought into said fluid to form said disulfide reaction product.

11. The method of claim 10 wherein said pipe is well tubing producing said fluid from within a well bore.

12. The method of claim 1 wherein said pipe is a pipe transporting said fluid from one location to another.

13. The method of claim wherein said fluid is a drilling fluid being transported from the earth's surface down within a drill pipe to the bottom of a well bore and back to the earth's surface through the annulus formed between the drill pipe and the wall of said well bore.

14. A system for continuously forming a corrosion protective film of substantially amorphous iron disulfide on the walls of oil filled pipe, comprising:
   (a) means causing continuous flow a fluid including corrodents through a pipe;
   (b) means for continuously injecting a reactant material into said pipe to continuously mix with said fluids and continuously react within said fluid to cause iron disulfide to form as a reaction product which is continuously precipitated as a corrosion protective film of iron disulfide on the walls of said pipe.

15. The system of claim 14 wherein said reactant material is ammonium nitrate and said fluid includes hydrogen sulfide and ferrous iron.

16. The system of claim 14 wherein said reactant is wettable elemental sulfur and said fluid includes ferrous iron.

17. The system of claim 14 wherein said reactant is a polysulfide and said fluid includes ferrous iron.

18. The system of claim 14 wherein said reactant comprises a polysulfide and ferrous iron.

19. The system of claim 14 wherein said pipe is well tubing extending in a well bore from a producing formation to the earth's surface and said reactant is being injected through an injection pipe extending from the earth's surface to the producing formation.

20. The system of claim 14 wherein fluid is drilling mud and said pipe is drill pipe carrying said drilling mud to the bottom of a well bore being drilled and returned to the earth's surface through an annulus formed within said well bore by said drill pipe.

* * * * *